July 2, 1940.　　　H. KIKUCHI ET AL　　　2,206,608
APPARATUS EMPLOYING HIGH VOLTAGE-HIGH FREQUENCY ELECTRIC CURRENT
Original Filed Oct. 24, 1938
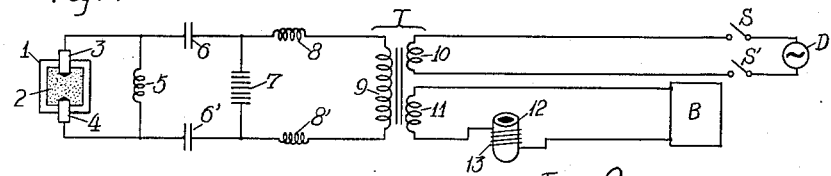
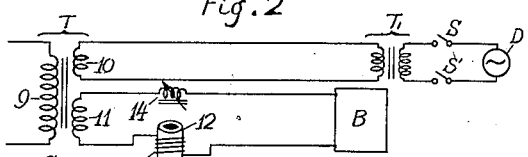
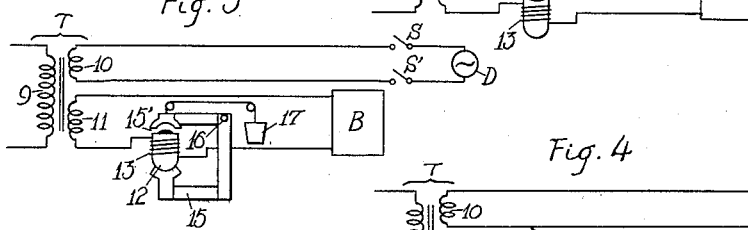
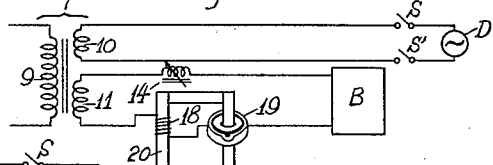
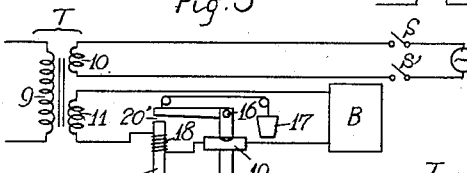
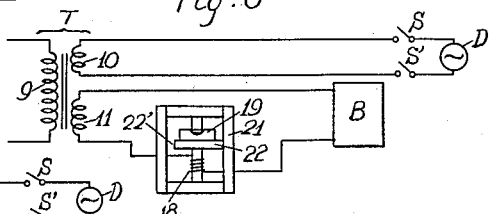
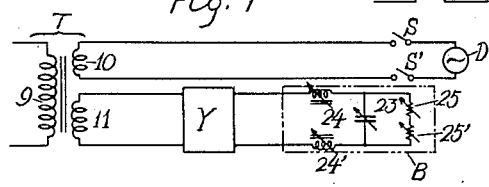
Inventors:
Hideyuki Kikuchi
and Mitsutoshi Hirose Patented July 2, 1940

2,206,608

UNITED STATES PATENT OFFICE 2,206,608

APPARATUS EMPLOYING HIGH VOLTAGE-HIGH FREQUENCY ELECTRIC CURRENT

Hideyuki Kikuchi and Mitsutoshi Hirose, Tokyo, Japan; said Hirose assignor to said Kikuchi Original application October 24, 1938, Serial No. 236,778. Divided and this application August 22, 1939, Serial No. 291,438. In Japan November 22, 1937

1 Claim. (Cl. 13—23)

This application is a division of the applicants' earlier application Serial No. 236,778 filed October 24, 1938.

Our invention relates to improvements in an apparatus adapted for metallurgy and similar fields of utilization wherein high voltage, high frequency electric current is employed. More particularly, our invention relates to the manner of utilization of the equivalent of an inductor element which is conventionally inserted in the primary circuit of the current source, and which inductor element is employed for regulation of the high frequency circuit.

In a high voltage, high frequency electric circuit such as is employed for ore-disintegration furnaces, infusing chambers, impregnating cells and the like, it is customary practice to insert an inductor element in the primary circuit of the current source, to balance, by means of the lagging current demand of such inductor element, the leading current required by the capacitative load and at the same time, to stabilize at a selected frequency, the oscillation of the high frequency current.

It is well known that the large capacity of the inductor element inserted in the primary circuit of this kind of apparatus results in wasting a large part of the electric power supply as power loss, great heat being generated within the inductor element.

According to our invention this conventional and energy-wasting inductor in the primary circuit is replaced by a device inserted in the circuit of a third coil of a supply transformer, within which device useful heat is generated by electromagnetic induction, the said device complemented by a second, balancing circuit, maintaining the required coefficient of induction of the primary circuit.

An important object of our invention, therefore, is to utilize at least a part of the electric power which ordinarily is wasted at the inductor of known apparatus, and to convert it into electric heat for useful purposes, the oscillation-stabilizing and phase-balancing functions of the inductive element being retained.

In the accompanying drawing are illustrated diagrammatically circuits according to several forms of apparatus according to our invention, by way of example.

Therein, Figures 1 through 6 illustrate connections for heaters of the electromagnetic induction type, and having a large leakage of the magnetic flux, which heaters are employed in lieu of phase-balancing inductors, in a tertiary circuit of the primary side of a high voltage, high frequency circuit, the secondary side of which is directly connected to an ore-disintegrating furnace;

Figure 7 illustrates an example of a balancing circuit employed in co-operation with an induction heater, which latter is inserted in series in a tertiary circuit of the primary side.

In Figures 2 through 7, the secondary circuit is omitted; it being the same as in Figure 1.

Referring to Figure 1, there is shown a disintegrating furnace 1 made of insulating materials and having a pair of carbon or other electrodes 3 and 4. Powdered raw material 2 is charged in the furnace. This raw material may in a typical instance consist of a mixture of powdered ore and one or more reducing agents, fluxes, melting agents and heating agents. For example, a mixture of 100 parts of hematite containing 40% iron, 5–10 parts of coke and 10–5 parts of coal may be charged into the furnace, the fineness of the materials being 15 mesh or more. For rich ore, it is advisable to add 10–20 parts of insulating piezo-electric crystalline substances such as $SiO_2$, $TiO_2$, $ZrO_2$, for accelerating the reaction in the disintegrating furnace.

An oscillating coil 5 and a sparking system such as a multiple quenched spark gap 7 are inserted in parallel with the disintegrating furnace, while condensers 6, 6', high-frequency choke coils 8, 8' and the secondary coil 9 of a low or medium frequency step-up transformer T are inserted in series in the secondary circuit, to complete an oscillating circuit.

An induction heater 12 having an induction coil 13 wound thereon is inserted in the circuit of a third coil of the primary side of the transformer, and the second coil 10 is supplied energy from the power source, such as dynamo D of a low or medium frequency; that is, from say 25 to 20,000 cycles per second. B is a balancing circuit which is inserted either in parallel or in series in the tertiary circuit.

Should the ordinary power line be availed of as the power source, a second transformer $T_1$ is employed to obtain the required voltage for the primary circuit, as shown in Figure 2.

In Figure 2, a second, adjustable inductor 14 is provided in the tertiary circuit. While the electric power required to reduce the ore in the disintegrating furnace 1 and that consumed at the remelting induction heater 12 are automatically distributed in a proper ratio, varying in each instant according to the characteristic of the circuits and the progress of the reaction, due to the automatic controlling action of a high-frequency generating circuit, revertheless the provision in the primary circuit of the adjustable inductor 14 simplifies the precise control of the power distribution.

In Figure 3 a coreless induction heater 12 forms part of a magnetic circuit 15 having a small gap 15' for the leakage of flux, this gap between the magnetic poles being adjustable by means of a hinge 16 and a counter-balance 17. This arrangement ensures that a proper induction coefficient can be obtained, so as to have the induction heater 12 work effectively.

The core type induction heater 19 shown in Figure 4 provides a closed magnetic circuit 20 and a coil 18 of the primary circuit around the core. Figure 5 illustrates a similar induction heater having a flux leakage gap 20' and a gap-adjusting device 16—17.

In Figure 6 is shown a core type induction furnace having a square lattice type core 21, and crossed arms 22 fixed therein, the furnace being mounted about one of the crossed arms and the coil of the primary circuit on another arm. An adjustable small gap 22' may be provided in one of the arms, to control the amount of leakage flux.

In Figure 7, Y is an electromagnetic induction heater which is inserted in parallel with the balancing circuit B in the tertiary circuit. The balancing circuit consists of variable condenser 23, variable inductances 24, 24' and variable resistances 25' 25' but this is merely an example of a balancing circuit. Any network consisting of various combinations of inductances, capacitances and resistances can be used for this purpose.

In these instances the induction heater circuit Y which is either in parallel or in series with the balancer B in the third circuit, receives a part of the electric power supply when the disintegrating furnace in the secondary circuit is operating to reduce the powdered ore.

The switch S in the primary circuit is closed and opened repeatedly. In a typical example it is closed for nine minutes, corresponding to the operating type of the high voltage, high frequency disintegrating furnace, being opened for one minute.

It is preferable that several sets, each consisting of a sparking device and a high frequency disintegrating furnace, be prepared for each induction heater, to be used alternately therewith, whereby the necessity of prolonging the switching-off period can be minimized.

While in the foregoing explanation, my invention is described with respect to its application to an ore-disintegrating furnace by way of example, it is also applicable to other fields, such as an infusing bath for dying, cocoon boiling, leather tanning and other fields of industry, where high voltage, high frequency electric currents are directly used, and where other types of induction heaters and high-frequency generator circuits can be employed, modified according to the needs of the art or industry to which they are to be applied.

What we claim is:

Electrical apparatus, comprising an electrical furnace constituting a capacitative load, a source of high voltage, high frequency electrical supply therefor, a step-up transformer in said source of supply, said transformer having a secondary high tension side, a primary low tension side, and a tertiary winding, the said furnace being in the high tension side of said transformer, an induction furnace and a balancing circuit in said tertiary winding, the reactance of the induction furnace, combined with that of the balancing circuit, being approximately sufficient to balance the leading power demand of the capacitative load, and to stabilize oscillation of the high frequency circuit.

HIDEYUKI KIKUCHI.
MITSUTOSHI HIROSE.